US008559779B2

(12) United States Patent
Kozar et al.

(10) Patent No.: US 8,559,779 B2
(45) Date of Patent: Oct. 15, 2013

(54) TRANSPARENT COMPOSITES WITH ORGANIC FIBER

(75) Inventors: Michael P. Kozar, Seattle, WA (US); Mark S. Wilenski, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 263 days.

(21) Appl. No.: 12/901,342

(22) Filed: Oct. 8, 2010

(65) Prior Publication Data

US 2012/0088063 A1 Apr. 12, 2012

(51) Int. Cl.
*G02B 6/10* (2006.01)
*B32B 5/12* (2006.01)
*G02B 6/00* (2006.01)

(52) U.S. Cl.
USPC ............ 385/131; 385/147; 428/113; 428/114

(58) Field of Classification Search
USPC ............................ 385/131; 428/105, 113, 114
See application file for complete search history.

(56) References Cited

U.S. PATENT DOCUMENTS

| | | | | |
|---|---|---|---|---|
| 5,039,566 A * | 8/1991 | Skubic et al. | ................. | 428/113 |
| 5,217,794 A * | 6/1993 | Schrenk | ......................... | 428/220 |
| 5,665,450 A | 9/1997 | Day et al. | | |
| 5,783,120 A * | 7/1998 | Ouderkirk et al. | ............ | 264/1.34 |
| 5,825,543 A * | 10/1998 | Ouderkirk et al. | ........ | 359/487.02 |
| 6,141,149 A * | 10/2000 | Carlson et al. | ............ | 359/489.13 |
| 6,326,094 B1 * | 12/2001 | Asano et al. | ...................... | 428/38 |
| 6,818,306 B2 * | 11/2004 | Miller et al. | ................... | 428/413 |
| 7,356,229 B2 * | 4/2008 | Ouderkirk et al. | ............ | 385/115 |
| 7,356,231 B2 * | 4/2008 | Ouderkirk et al. | ............ | 385/123 |
| 7,362,943 B2 * | 4/2008 | Ouderkirk et al. | ............ | 385/147 |
| 7,386,212 B2 * | 6/2008 | Ouderkirk et al. | ............ | 385/127 |
| 7,406,239 B2 * | 7/2008 | Ouderkirk et al. | ............ | 385/131 |
| 7,599,592 B2 * | 10/2009 | Benson et al. | ................. | 385/122 |
| 7,738,763 B2 * | 6/2010 | Ouderkirk et al. | ............ | 385/141 |
| 7,773,834 B2 * | 8/2010 | Ouderkirk et al. | ............... | 385/11 |
| 7,790,277 B2 * | 9/2010 | Wilenski et al. | ............ | 428/293.4 |
| 2004/0012855 A1 * | 1/2004 | Allen et al. | .................... | 359/490 |
| 2006/0193577 A1 | 8/2006 | Ouderkirk | | |
| 2006/0193582 A1 * | 8/2006 | Ouderkirk et al. | ............. | 385/126 |
| 2006/0255486 A1 * | 11/2006 | Benson et al. | ................ | 264/1.34 |
| 2006/0257678 A1 * | 11/2006 | Benson et al. | ............. | 428/542.8 |
| 2006/0257679 A1 * | 11/2006 | Benson et al. | ............. | 428/542.8 |
| 2008/0145638 A1 | 6/2008 | Hellring | | |
| 2008/0152282 A1 * | 6/2008 | Ouderkirk et al. | ............... | 385/36 |
| 2008/0241537 A1 | 10/2008 | Sennett | | |
| 2012/0088063 A1 * | 4/2012 | Kozar et al. | .................... | 428/114 |
| 2012/0152099 A1 * | 6/2012 | Wilenski et al. | ............. | 89/36.02 |
| 2012/0156421 A1 * | 6/2012 | Davis et al. | .................... | 428/113 |

FOREIGN PATENT DOCUMENTS

WO WO02/074533 9/2002

OTHER PUBLICATIONS

European Search Report—EP 11 18 4158, dated Jan. 24, 2012.
Hongy Lin et al., "Optical and Mechanical Properties of Optically Optical and Mechanical Properties of Optically", Polymer Engineering and Science, Mid-Mar. 1992, vol. 32, No. 5.

* cited by examiner

*Primary Examiner* — Rhonda Peace

(57) ABSTRACT

A composite article comprises a substantially transparent matrix and at least one substantially transparent organic fiber embedded within the matrix. The matrix and the organic fiber may have substantially equivalent refractive indices within a wavelength band of interest.

19 Claims, 6 Drawing Sheets

TRANSPARENT COMPOSITES WITH ORGANIC FIBER

CROSS-REFERENCE TO RELATED APPLICATIONS (Not Applicable)

STATEMENT RE: FEDERALLY SPONSORED RESEARCH/DEVELOPMENT (Not Applicable)

FIELD

The present disclosure relates generally to composites and, more particularly, to optically transparent reinforced composite articles.

BACKGROUND

Glass is widely used as a transparency in a variety of applications due to its superior optical qualities. For example, glass is commonly used as glazing material or as an architectural material for buildings. Glass is also commonly used as a transparency in a variety of vehicular applications. Unfortunately, glass is a relatively dense material and is also relatively brittle such that relatively large thicknesses are required to provide the glass with sufficient strength to resist shattering when impacted by an object.

In an attempt to avoid the weight penalties associated with glass, transparencies may also be fabricated of polymeric material. For example, transparencies may be formed of transparent polymers such as acrylic (e.g., Plexiglas™) which is less dense than glass and which possesses suitable optical properties. Unfortunately, acrylic has relatively low strength properties making it unsuitable for many applications where high impact resistance is required.

In consideration of the weight penalties associated with glass and the strength limitations associated with transparent polymers, manufacturers have fabricated transparencies from polymeric materials reinforced with glass fibers to enhance the strength and impact resistance of the polymeric transparency. Unfortunately, the addition of glass fibers to polymeric material may undesirably affect the optical quality of the transparency. For example, the glass fibers may have a cylindrical configuration such that each one of the glass fibers acts as a small lens. The effect of a plurality of the glass fibers, each acting as a small lens, is a scattering of light as the light passes through the transparency such that objects viewed through the transparency may appear blurred.

A further drawback associated with transparencies fabricated from glass fiber-reinforced polymeric materials is the variation in the refractive indices of the glass material and polymeric material as temperature changes. Refractive index, represented by $n(\lambda,T)$, is a function of wavelength $\lambda$ incident on a material at temperature T. In the case of glass fiber-reinforced polymeric materials, the refractive index of the polymeric material generally decreases with increasing temperature for a given wavelength or wavelength band such as the visible spectrum. In contrast, the refractive index of glass typically varies only slightly with changes in temperature for the visible spectrum.

Such a change in refractive index of a material with temperature change of a material for a given wavelength may also be defined as the temperature coefficient of refractive index of the material, $dn(\lambda,T)/dT$. In the expression $dn(\lambda,T)/dT$, dn represents the change in refractive index of the material, $\lambda$ represents the wavelength of radiation (e.g., light) incident on the material, T represents temperature, and dT represents the change in temperature of the material. It should be noted that although a material may be described in terms of its refractive index at one or more wavelengths and temperatures, the temperature coefficient of refractive index of a material is also typically listed with the refractive index data for the material.

Although glass and polymeric material may be selected to have the same refractive index at a given match point temperature for a given wavelength, the differences in temperature coefficient of refractive index $dn(\lambda,T)/dT$ of the glass as compared to the temperature coefficient of refractive index $dn(\lambda,T)/dT$ of the polymeric material results in a change (e.g., an increasing difference) in the refractive indices of the two materials as the temperature diverges from the match point temperature. The change in refractive indices of the glass and polymeric material as temperature changes may result in a corresponding reduction in optical quality of the transparency with change in temperature due to scattering of light at the glass/polymer interface.

As can be seen, there exists a need in the art for an optically transparent composite article which has a relatively high degree of optical transparency with minimal optical distortion within a relatively broad temperature range and which exhibits improved ballistic and mechanical performance with minimal weight.

BRIEF SUMMARY

The above-described needs associated with transparent composite articles are specifically addressed and alleviated by the present disclosure which, in an embodiment, provides a substantially optically transparent composite article comprising a substantially transparent matrix and at least one substantially transparent organic fiber embedded within the matrix. The fiber has a refractive index that is substantially equivalent to the matrix refractive index within a wavelength band of interest.

In a further embodiment, disclosed is a substantially transparent composite article providing favorable optical transmission characteristics and minimal distortion. The composite article may comprise a substantially transparent matrix and a plurality of substantially transparent organic fibers embedded within the matrix. The fibers may have a refractive index that is substantially equivalent to the matrix refractive index within a wavelength band of interest. The matrix and the organic fiber may also have substantially equivalent temperature coefficients of refractive index. The temperature coefficient of refractive index represents change in refractive index of the material with change in temperature of the material.

In a further embodiment, disclosed is a methodology of manufacturing a composite article comprising one or more of the steps of selecting a wavelength band of interest and providing a substantially transparent matrix having a matrix refractive index. The method may additionally include providing at least one substantially transparent organic fiber having a refractive index that is substantially equivalent to the matrix refractive index within the wavelength band of interest. The method may further include embedding the organic fiber within the matrix.

In a further embodiment, disclosed is a methodology of manufacturing a composite article comprising one or more of the steps of selecting at least one of a visible spectrum and an infrared spectrum as a wavelength band of interest to which the composite article is to be subjected. A temperature range may be selected to which the composite article is to be subjected. The method may include providing a substantially transparent matrix having a matrix refractive index and a temperature coefficient of refractive index. A plurality of substantially transparent organic fibers may be provided wherein the organic fibers have a refractive index and a temperature coefficient of refractive index. The temperature coefficient of refractive index of the fibers is substantially equivalent to the temperature coefficient of refractive index of the matrix within the temperature range. The refractive index of the fibers may be substantially equivalent to the matrix refractive index within the wavelength band of interest. The method may further include the step of providing the organic fibers in an elongated cross section having an opposing pair of substantially planar fiber faces and embedding the organic fibers within the matrix to form at least one layer of organic fibers within the matrix. The substantially planar fiber faces of the organic fiber may be oriented to be substantially parallel to a substantially planar article surface of the composite article.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numerals refer to like parts throughout and wherein.

DETAILED DESCRIPTION

Figure 1:
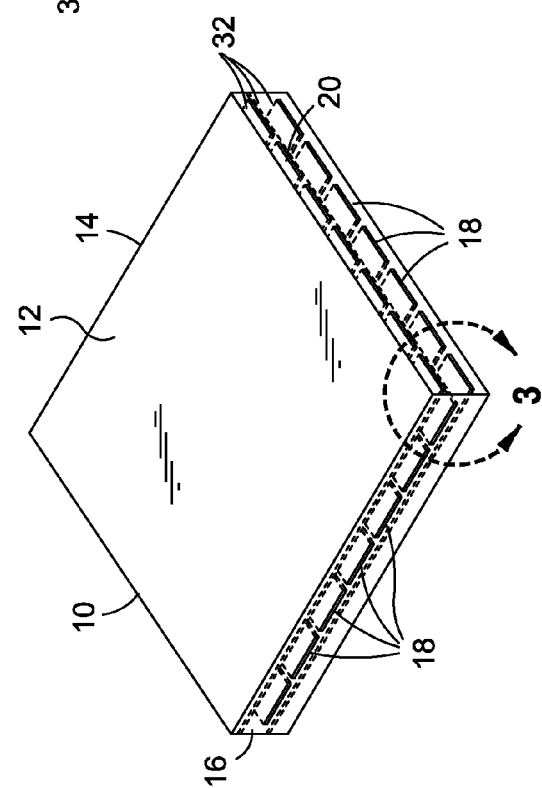
FIG. 1 is a perspective illustration of a composite article in an embodiment comprising substantially transparent polymeric matrix and a plurality of substantially transparent organic fibers.

Referring now to the drawings wherein the showings are for purposes of illustrating preferred and various embodiments of the disclosure, shown in FIG. 1 is an embodiment of a composite article 10. The composite article 10 may be fabricated as a fiber-reinforced composite panel 14 comprising a substantially transparent polymeric matrix 16 and a plurality of substantially transparent organic fibers 18 embedded within the polymeric matrix 16. Although illustrated in FIG. 1 in a panel 14 configuration, the composite article 10 may be provided in any one of a wide variety of sizes, shapes and configurations, without limitation, and may include planar and/or compound surfaces.

Figure 4:
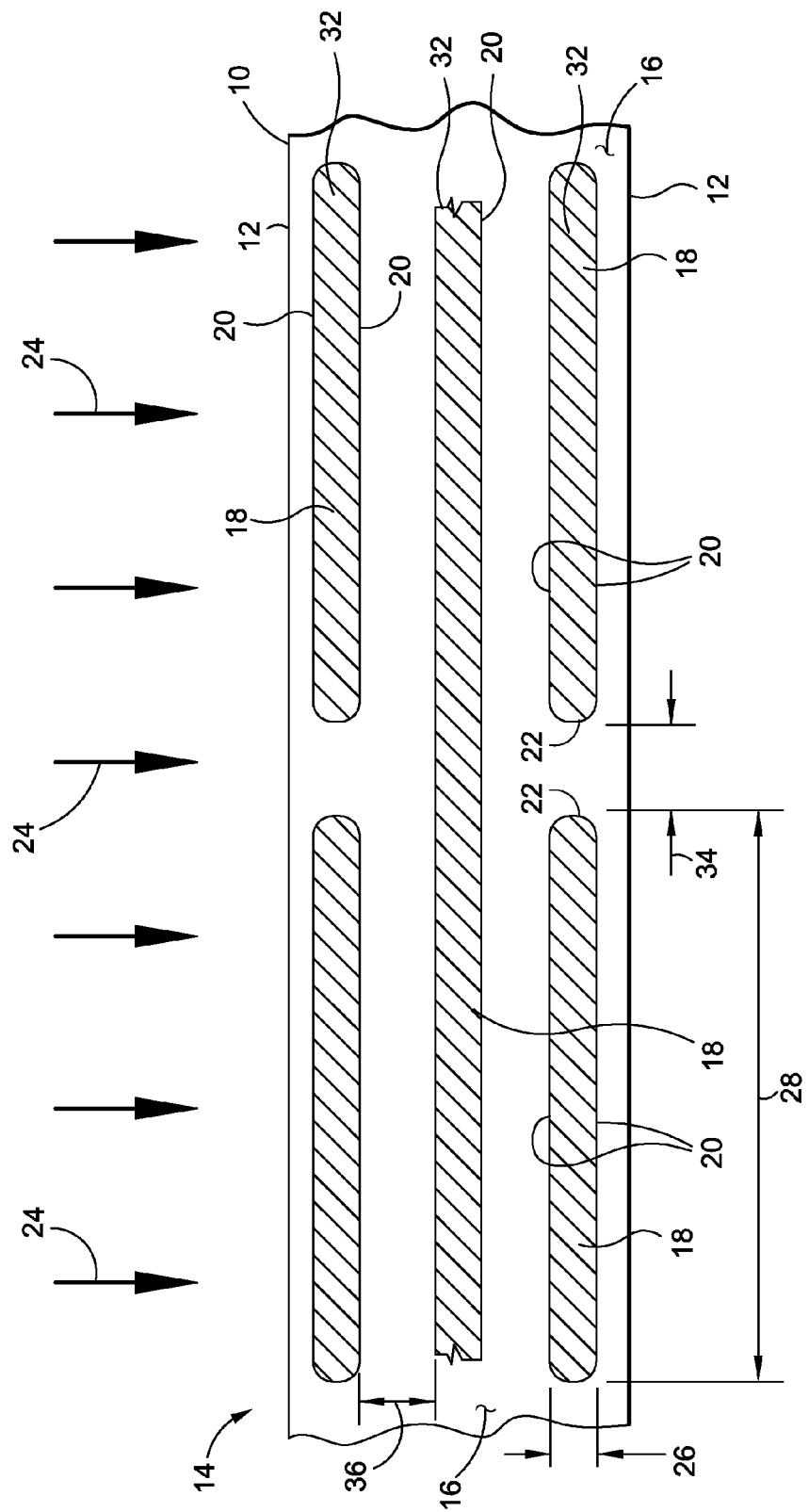
FIG. 4 is an enlarged sectional illustration taken along line 4-4 of FIG. 3 and illustrating an embodiment of the organic fibers having a generally elongated cross-sectional shape.

Referring to FIG. 4, the organic fibers 18 of the composite article 10 are embedded within the polymeric matrix 16 and are preferably shaped to have at least one substantially flat or planar fiber face 20 or, more preferably, an opposing pair of substantially flat or planar fiber faces 20. However, the organic fibers 18 may be provided in any one of a variety of alternative shapes and sizes including single curvatures (not shown) on any one of the fiber faces 20 of the organic fibers 18. The combination of substantially transparent polymeric matrix 16 and substantially transparent organic fibers 18 results in a substantially transparent composite article 10 that facilitates transmission of radiation or light in any wavelength that is incident 24 on the composite article 10 as illustrated in FIG. 4. For example, the matrix 16 and the organic fibers 18 may be selected to facilitate the transmission of radiation in the visible spectrum and/or radiation in the infrared spectrum through the composite article 10.

Advantageously, the matrix 16 and the organic fiber 18 preferably have complementary or substantially equivalent refractive indices within a broad temperature range for a wavelength band of interest. The refractive index of a given material at a given temperature T may be defined as the ratio of the speed of light at a given wavelength $\lambda$ in a vacuum to the speed of light at the same wavelength $\lambda$ in the given material at the given temperature T. The refractive indices of the matrix 16 and the organic fiber 18 are preferably substantially equivalent or closely matched within a wavelength band of interest for a given temperature range in order to minimize or reduce scattering of light or radiation at the interface of the matrix 16 with the organic fiber 18. Such scattering of light may otherwise occur at the interface of matrix and fiber having substantially different refractive indices. In the presently disclosed embodiments, the substantially equivalent refractive indices of the matrix 16 and the organic fiber 18 may facilitate a relatively high degree of optical transmission and low distortion of radiation through the composite article 10 and may effectively expand the useful operating temperature of the composite article 10.

Referring still to FIG. 4, the matrix 16 and organic fiber 18 may also be defined as having substantially equivalent temperature coefficients of refractive index $dn(\lambda,T)/dT$ wherein $dn(\lambda,T)/dT$ is the partial derivative of $n(\lambda,T)$ with respect to temperature T. As indicated above, the temperature coefficient of refractive index $dn(\lambda,T)/dT$ of a material may be defined as the change in refractive index of the material for a given wavelength with change in temperature of the material. Although the matrix 16 and the organic fiber 18 of the present disclosure are described as preferably having substantially equivalent refractive indices within a broad temperature range for a wavelength band of interest, the matrix 16 and the organic fiber 18 may be described in terms of having substantially equivalent temperature coefficients of refractive index as the temperature coefficient of refractive index of a material is typically listed in available literature with the refractive index data for the material.

In the present disclosure, the polymeric matrix 16 and the organic fiber 18 preferably have substantially equivalent refractive indices within a broad temperature range for a wavelength band of interest such that the respective temperature coefficients of refractive index are also substantially equivalent. In an embodiment, the temperature coefficients of refractive index for the polymeric matrix 16 and the organic fiber 18 may be such that the refractive indices of the polymeric matrix 16 and the organic fiber 18 correspond to substantially similar rates of decrease in the refractive indices of the matrix 16 and the organic fiber 18 for a given wavelength as temperature increases. The advantages provided by the substantially equivalent refractive indices and substantially equivalent temperature coefficients of refractive index of the matrix 16 and organic fiber 18 include improved optical transparency of the composite article 10 with minimal distortion within a relatively broad temperature range as described in greater detail below.

Referring to FIG. 1, shown is the composite article 10 formed as a panel 14 and comprising a plurality of organic fibers 18 formed of organic, polymeric matrix 16 and wherein the organic fibers 18 are embedded within the polymeric matrix 16. The organic fibers 18 may comprise structural reinforcing for the substantially transparent polymeric matrix 16 and may improve the mechanical performance of the composite article 10. For example, the structural reinforcing provided by the organic fibers 18 may improve the specific stiffness of the composite article 10 (i.e., stiffness of the composite article 10 divided by the density) due to the enhanced tensile strength and modulus of elasticity of the organic fibers 18 as described in greater below.

Figure 2:
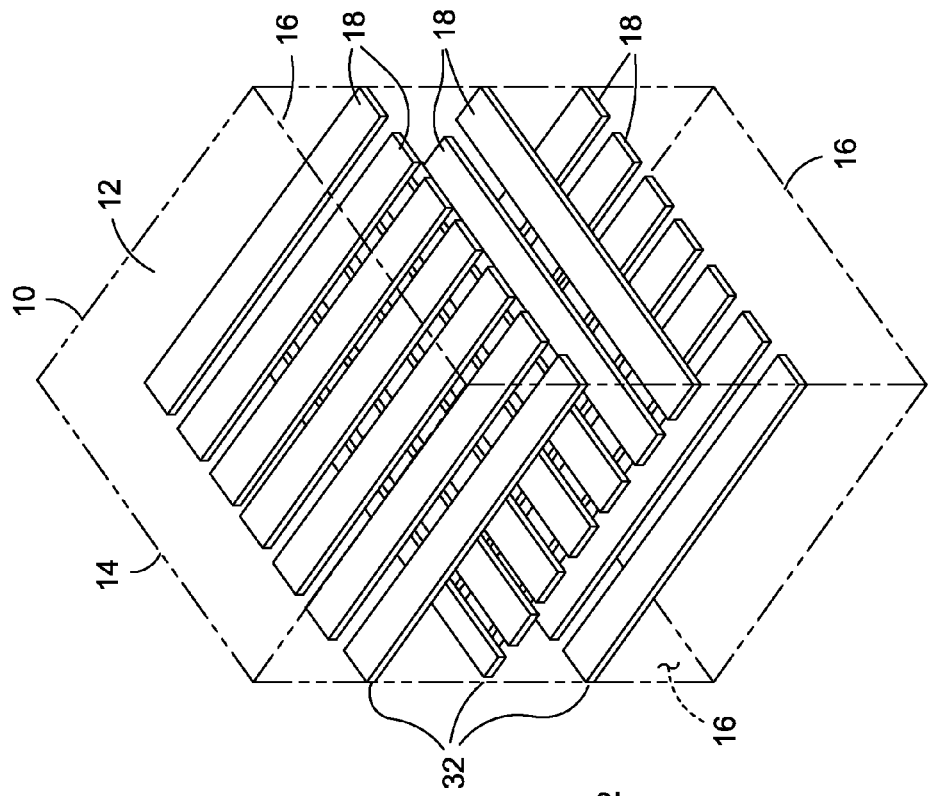
FIG. 2 is an exploded perspective illustration of the composite article of FIG. 1 and illustrating a plurality of layers of the organic fibers.

Referring to FIG. 2, shown is an exploded illustration of the panel 14 of FIG. 1 and illustrating a plurality of the organic fibers 18 formed as strips and arranged in layers 32 within the matrix 16. Each one of the organic fibers 18 preferably has an elongated cross-sectional shape preferably including an opposed pair of substantially planar fiber faces 20. In an embodiment, the fiber faces 20 of the organic fibers 18 may be arranged to be substantially parallel to the composite article surface 12 to enhance the optical performance of the composite article 10 in a manner as described in greater detail below.

Figure 3:
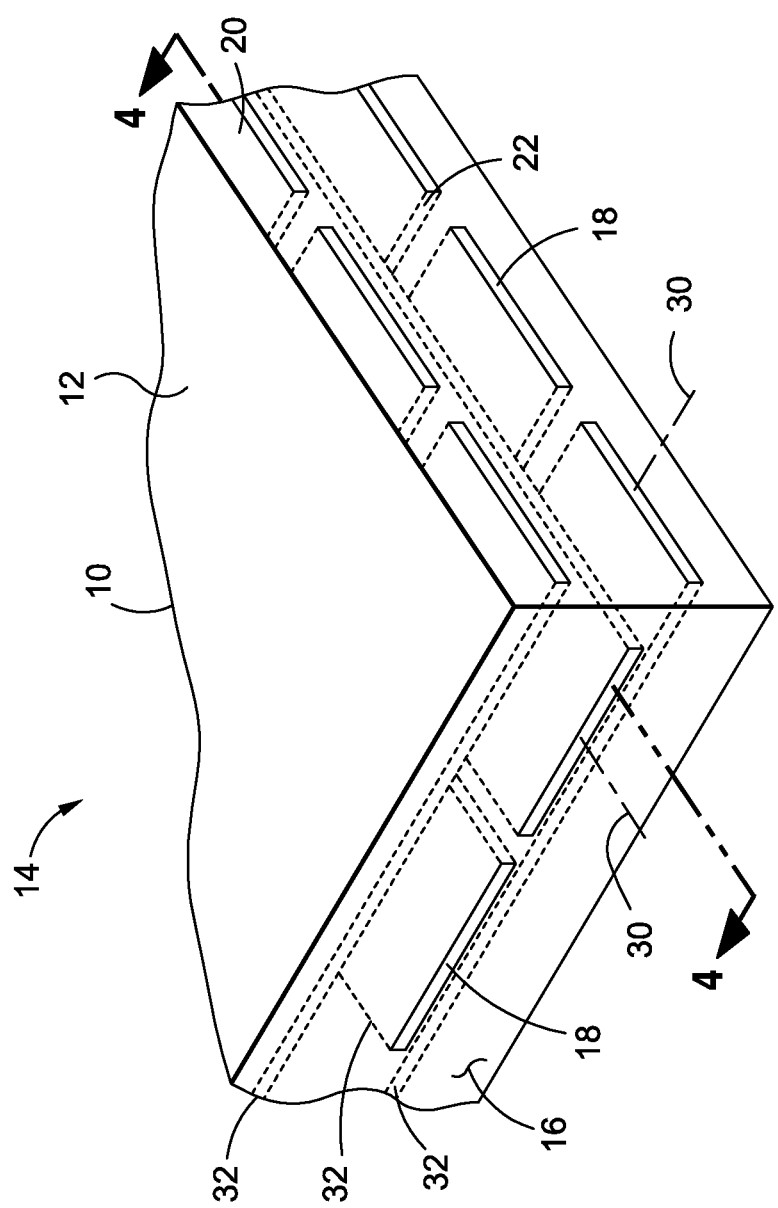
FIG. 3 is an enlarged perspective illustration of a portion of the composite article of FIG. 1 and illustrating the arrangement of the layers of organic fibers within the matrix.

Referring to FIG. 3, shown is an enlarged perspective illustration of the composite article 10 wherein the organic fibers 18 are arranged in layers 32 within the matrix 16 of the composite article 10. The organic fibers 18 may be arranged in any orientation relative to one another within the composite article 10 and are not limited to the arrangement shown in FIG. 3 wherein the organic fibers 18 in each one of the layers 32 are aligned with one another in substantially parallel relationship. Although the composite article 10 is illustrated as having three of the layers 32 of organic fibers 18, any number of layers 32 may be provided. For example, the composite article 10 may contain a single layer 32 of organic fibers 18 or tens or more of the layers 32.

The organic fibers 18 in one or more of the layers 32 may be oriented in any manner relative to the other organic fibers 18 in the composite article 10 including, but not limited to, unidirectional arrangements wherein the lengths of the organic fibers 18 in a layer 32 are oriented generally parallel to one another. The organic fibers 18 may also be oriented in a bi-directional arrangement or a cross-ply configuration wherein the organic fibers 18 in a layer 32 are oriented generally perpendicularly relative to the organic fibers 18 in other layers 32. In this regard, the organic fibers 18 in any layer 32 may be oriented in any direction relative to one another including non-uniform arrangements of the organic fibers 18 within a layer 32. Furthermore, the organic fibers 18 in a layer 32 may be arranged in a woven configuration (not shown) or in a non-woven configuration such as that which is illustrated in FIGS. 1-4. The organic fibers 18 of one or more layers 32 may be arranged to be in contacting or non-contacting arrangement with the organic fibers 18 of adjacent layers 32. For example, FIG. 4 illustrates the layers 32 of organic fibers 18 arranged in non-contacting relationship with one another such that the layers 32 are separated by matrix 16 material.

Referring to FIG. 3, shown is an enlarged perspective illustration of the composite article 10 illustrating the relative positions of the organic fibers 18 in the plurality of layers 32. The organic fibers 18 of each layer 32 are illustrated as being oriented substantially perpendicularly relative to the organic fibers 18 of the immediately adjacent layers 32. Furthermore, the organic fibers 18 of each layer 32 are oriented in substantially parallel alignment with adjacent ones of the organic fibers 18 of the same layer 32. However, FIG. 3 is an illustration of a non-limiting embodiment of the composite article 10 in a panel 14 configuration and is not to be construed as limiting alternative configurations of the composite article 10 or alternative arrangements of the organic fibers 18 within the polymeric matrix 16 of the composite article 10. For example, the organic fibers 18 of one layer 32 may be oriented in perpendicular orientation relative to the organic fibers 18 of an adjacent one of the layers 32. Furthermore, the organic fibers 18 of one layer 32 may be oriented at any non-perpendicular angle (e.g., 15°, 22.5°, 45°, 60°, etc.) relative to the organic fibers 18 of an adjacent one of the layers 32.

Referring to FIG. 4, shown is a cross-sectional illustration of an embodiment of the composite article 10 illustrating the arrangements of the organic fibers 18 in the layers 32. As can be seen in FIG. 4, the organic fibers 18 preferably have an elongated cross-sectional shape with relatively flattened or substantially planar fiber faces 20 to minimize scattering of light that may otherwise occur when light passes through a curved surface. Advantageously, the substantially planar configuration of the fiber faces 20 of the organic fibers 18 minimizes scattering of light and improves the optical quality of the composite article 10. The above-mentioned substantially equivalent temperature coefficients of refractive index of the organic fiber 18 and polymeric matrix 16 mitigate reductions in optical quality due to temperature change as described in greater detail below.

Referring still to FIG. 4, the generally elongated shape of the organic fibers 18 preferably includes a relatively high aspect ratio defined as the ratio of fiber width 28 to fiber thickness 26. In an embodiment, the aspect ratio may vary from approximately 3 to approximately 500 although the fiber 18 cross section may have an aspect ratio of any value. In an embodiment, the fiber thickness 26 may be in the range from approximately 5 microns to approximately 5,000 microns (0.0002 to 0.20 inch). However, the organic fiber 18 may be provided in any fiber thickness 26, without limitation.

Referring to FIG. 4, the elongated cross-sectional shape of the organic fibers 18 may include the pair of substantially planar fiber faces 20 which are preferably oriented substantially parallel to the article surface 12 of the composite article 10. However, the organic fibers 18 may be embedded within the matrix 16 such that the fiber faces 20 of the organic fiber 18 are arranged in any degree of orientation relative the article surface 12. Although illustrated as being substantially planar, the fiber faces 20 of the organic fibers 18 may be slightly curved including slightly concave, slightly convex or crowned and are not limited to a strictly substantially planar or flat profile. Even further, it is contemplated that the fiber faces 20 of the organic fibers 18 may include one or more surface features (not shown) on one or more of the fiber faces 20.

As can be seen in FIG. 4, the organic fibers 18 within a given layer 32 may be embedded within the matrix 16 at a desired fiber spacing 34. For example, the organic fibers 18 may be arranged at a fiber spacing 34 of up to approximately 5,000 microns (approximately 0.20 inch) or greater. The fiber spacing 34 may be defined as an average lateral distance between the side edges 22 of adjacent ones of the organic fibers 18 along the length of the organic fibers 18 within a given layer 32. In addition, the organic fibers 18 may be arranged such that opposing side edges 22 of an adjacent pair of organic fibers 18 are in contacting relation with one another. However, the organic fibers 18 are preferably arranged as illustrated in FIG. 4 wherein the side edges 22 are located in spaced relation with one another. In this regard, the organic fibers 18 may be arranged at any fiber spacing 34 and are not limited to the fiber spacing 34 illustrated in FIG. 4.

Referring still to FIG. 4, the total volume of the organic fibers 18 relative to the total volume of the composite article 10 may be in the range of from approximately 10% to 90%. However, the organic fibers 18 may comprise any portion of the total volume of the composite article 10. The desired fiber volume may be selected based on a variety of parameters including, but not limited to, desired optical properties, desired strength properties, desired ballistic properties, desired stiffness, and weight requirements of the composite article 10.

Although FIG. 4 illustrates an elongated configuration for the organic fiber 18 cross section, the organic fiber 18 may be provided in any one of a variety of alternative cross-sectional shapes. For example, the organic fibers 18 may be formed in any cross-sectional shape including, but not limited to, a polygon, a quadrilateral, a square, a rectangle and any other suitable shape. In addition, the cross sections of the organic fibers 18 may include one or more fiber faces 20 that are curved or which include curved portions as mentioned above. In an embodiment, the cross sections of the organic fibers 18 are preferably elongated as illustrated in FIG. 4 with an aspect ratio (e.g., ratio of fiber width 28 to fiber thickness 26) of between approximately 3 and 500 although the organic fibers 18 may be provided in any aspect ratio as was indicated above.

Figure 5:
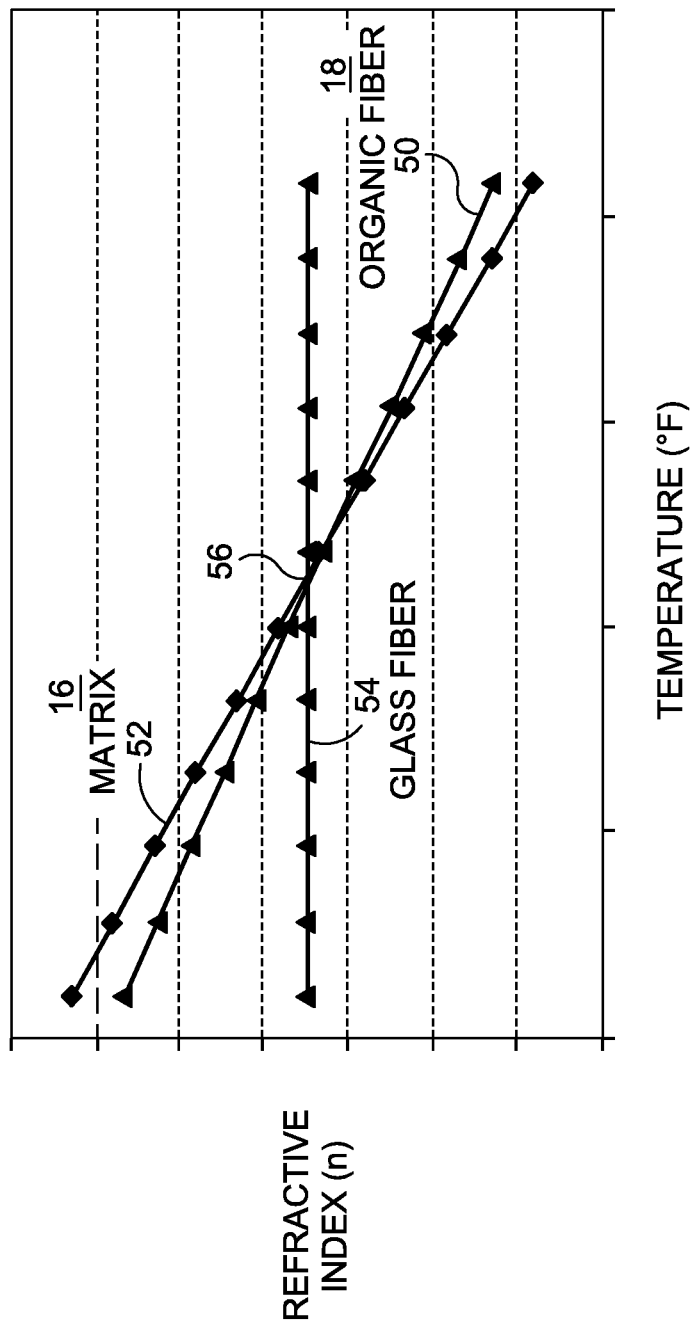
FIG. 5 is a graph of refractive index at a given wavelength versus temperature and illustrating the substantially equivalent refractive indices of polymeric matrix and organic fiber within a temperature band and further illustrating the mismatch between the refractive indices of the polymeric matrix and glass fiber with changing temperature.

Referring to FIG. 5, shown is a graph of plots of refractive index at a particular wavelength versus temperature for a polymeric matrix 16, organic fiber 18 and glass fiber 54. As can be seen in FIG. 5, the refractive indices 52, 50 of the matrix 16 and the organic fiber 18 are preferably substantially equivalent within a temperature range. For example, the graph of FIG. 5 illustrates the refractive indices 52, 50 of the matrix 16 and the organic fiber 18 as generally decreasing with increasing temperature. In a non-limiting embodiment of the present disclosure, the refractive indices 52, 50 of the matrix 16 and the organic fiber 18 may be selected to be substantially equivalent within a temperature range of from approximately −65° F. to approximately 220° F. However, FIG. 5 is representative of one embodiment of matrix 16 and organic fiber 18 and is not to be construed as limiting alternative embodiments of the matrix 16 and organic fibers 18 which may have refractive indices that vary with temperature in a manner that is different from that which is illustrated in FIG. 5.

As indicated above, in a preferred embodiment, the matrix 16 and organic fiber 18 may be described as having substantially equivalent refractive indices for a selected wavelength band of interest for a given temperature range to which the composite article 10 may be subjected. The wavelength band of interest may comprise any spectrum including the infrared spectrum which may span from approximately 760 nanometers (nm) to 2,500 nm (i.e., frequency of approximately 120 to 400 THz). Additionally, the wavelength band of interest to which the composite article 10 may be subjected may include the visible spectrum spanning from approximately 380 nm to 760 nm (i.e., frequency of approximately 790 to 400 THz).

The matrix 16 and organic fiber 18 compositions may be selected such that the refractive indices of the matrix 16 and organic fiber 18 are substantially equivalent within a temperature range for a selected wavelength band. For example, the matrix 16 and organic fiber 18 compositions may be selected such that the refractive indices are substantially equivalent within the ultraviolet spectrum.

As was earlier indicated, the refractive indices 52, 50 of the matrix 16 and the organic fiber 18 are selected such that the refractive indices 52, 50 are maintained within a predetermined maximum difference from one another for a given temperature range. For example, the matrix 16 and the organic fiber 18 may be selected such that the refractive indices 52, 50 are maintained within at least approximately 1 to 3 percent of one another for a given temperature range and a given wavelength band of interest. In a non-limiting embodiment, the given temperature range wherein the refractive indices 52, 50 are maintained within at least approximately 1 to 3 percent of one another may extend from approximately −65° F. to approximately 220° F. although the temperature may extend between any range. Likewise, the wavelength band of interest wherein the refractive indices 52, 50 are maintained within at least approximately 1 to 3 percent of one another may comprise the visible spectrum and/or the infrared spectrum although the wavelength band of interest may comprise any spectrum.

In an embodiment, the refractive indices 52, 50 of the matrix 16 and the organic fiber 18 may be selected such that the refractive indices 52, 50 are substantially equivalent for a temperature range in the visible spectrum and/or the infrared spectrum. Additionally, the refractive indices 52, 50 of the matrix 16 and the organic fiber 18 may be equivalent or, more preferably, identical for at least one temperature match point 56 within a given temperature range. For example, FIG. 5 illustrates a match point 56 temperature wherein the refractive index 52 of the matrix 16 matches the refractive index 50 of the organic fiber 18 at the intersection of the refractive index curves 52, 50 of the matrix 16 and the organic fiber 18.

However, FIG. 5 is representative of one embodiment of matrix 16 material and organic fiber 18 material and is not to be construed as limiting alternative materials which may have different refractive indices that may not necessarily match within a given temperature range for a given wavelength. Notably, FIG. 5 illustrates that the refractive indices 52, 50 of the matrix 16 and the organic fiber 18 are substantially equivalent along a temperature range as compared to the refractive index 54 of the glass fiber 54 which is relatively constant or slight in variation and therefore results in a relatively large divergence with the matrix refractive index 52 of the polymeric matrix 16 as temperature increases or decreases.

As indicated above, the matrix 16 and organic fibers 18 preferably have substantially equivalent temperature coefficients of refractive index. In an embodiment, the organic fiber 18 and the matrix 16 may be selected to have any suitable temperature coefficients of refractive index. FIG. 5 illustrates the refractive index 52, 50 of the matrix 16 and organic fiber 18 decreasing with increasing temperature. The relatively small difference in the refractive index 52, 50 of the matrix 16 and organic fiber 18 minimizes optical distortion as the temperature of the composite article 10 changes.

Figure 6:
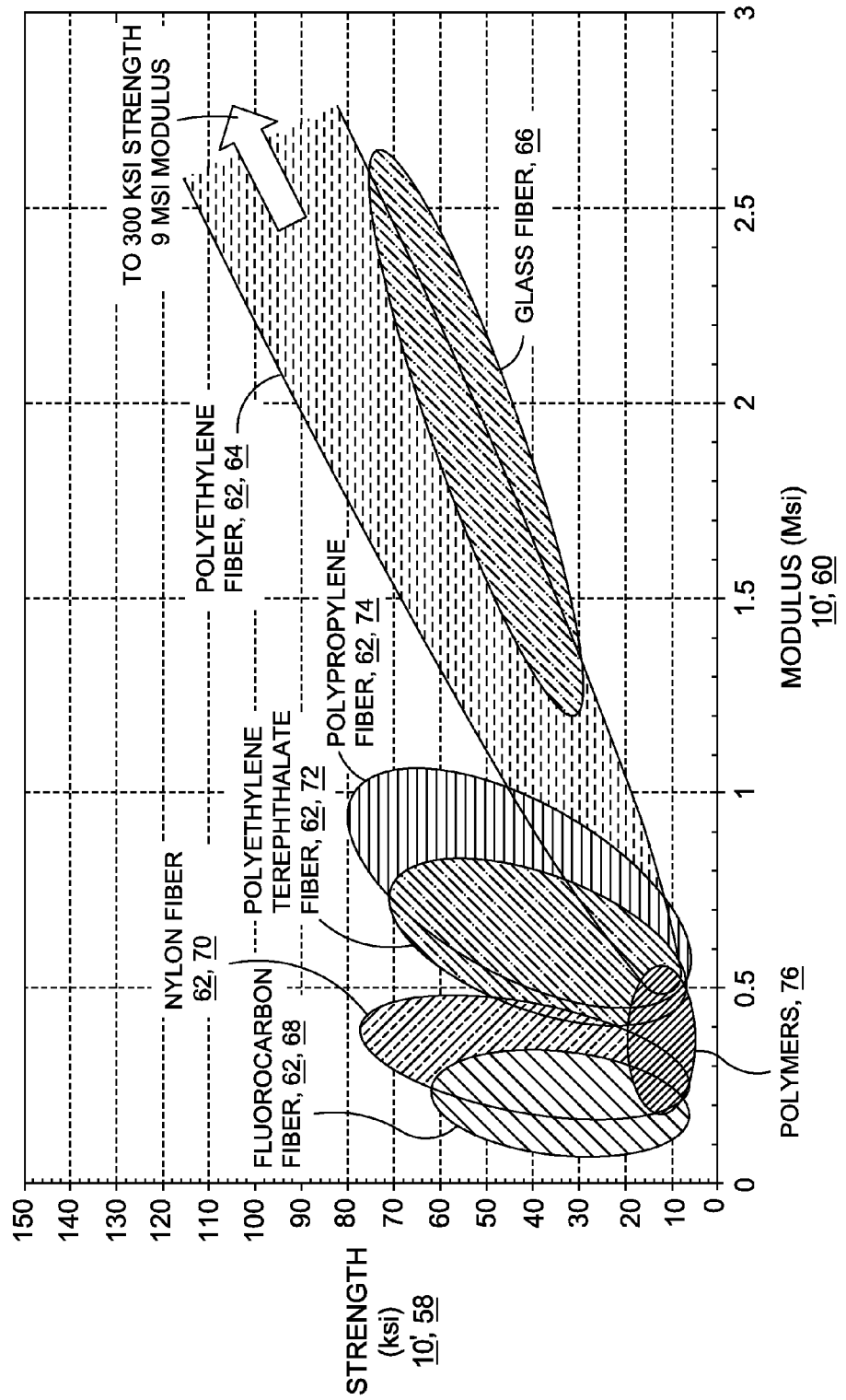
FIG. 6 is a graph of strength versus stiffness (i.e., modulus of elasticity) for composite articles having organic fibers in a cross-ply configuration and further illustrating strength versus stiffness for a composite article comprised of glass fibers in a cross-ply configuration.

Referring to FIG. 6, shown is a graph illustrating the mechanical performance of composite articles 10' comprised of organic fibers 62 embedded within polymeric matrix 16 (FIGS. 1-4) in a cross-ply configuration wherein the organic fibers 18 (FIG. 3) in a layer 32 (FIG. 3) may be oriented generally perpendicularly relative to the organic fibers 18 in other layers 32 similar to the organic fiber 18 arrangement illustrated in FIG. 3. FIG. 6 plots the strength 58 (in ksi) and modulus of elasticity 60 (in Msi) for the composite articles 10' of different compositions. FIG. 6 also graphically illustrates that the strength properties of a composite article 10' comprised of glass fiber 66 has strength 58 values that may be generally comparable to a composite article 10' comprised of organic fiber 62. Furthermore, FIG. 6 illustrates the composite article 10' comprised of glass fiber 66 as having a generally higher modulus of elasticity 60 than certain compositions of the organic fiber 62. However, as was earlier indicated, the temperature coefficient of refractive index of glass fiber 54 is substantially different than the temperature coefficient of refractive index of polymeric matrix 52 as illustrated in FIG. 5 which may result in increasingly poor optical quality of a glass fiber-reinforced polymer matrix composite article 10 as the temperature of the composite article 10 changes.

FIG. 6 illustrates strength 58 (in ksi) and modulus of elasticity 60 (in Msi) for composite articles 10' (FIGS. 1-4) having organic fibers 62 of different compositions. For comparison, FIG. 6 also illustrates the mechanical properties for a composite article comprised of polymers 76 (i.e., polymeric material) without organic fibers for reinforcing. As can be seen in FIG. 6, the composite article 10' comprised of polymers 76 without organic fibers 62 may have a tensile strength 58 in the range of from approximately 6 ksi to approximately 20 ksi and a modulus of elasticity 60 in the range of from approximately 0.2 Msi to approximately 0.55 Msi. In contrast, a composite article 10' comprising polymer matrix reinforced with fluorocarbon fiber 68 as the organic fiber 62 may have a tensile strength 58 in the range of from approximately 6 ksi to approximately 62 ksi and a modulus of elasticity 60 in the range of from approximately 0.1 Msi to approximately 0.3 Msi. A composite article 10' comprising Nylon™ fiber 70 may have a tensile strength 58 in the range of from approximately 6 ksi to approximately 78 ksi and a modulus of elasticity 60 in the range of from approximately 0.2 Msi to approximately 0.5 Msi.

Referring still to FIG. 6, also shown is a composite article 10' comprising polypropylene fiber 74 and having a tensile strength 58 in the range of from approximately 6 ksi to approximately 80 ksi and a modulus of elasticity 60 in the range of from approximately 0.45 Msi to approximately 1.1 Msi. A composite article 10' comprising polyethylene terephthalate fiber 72 may have a tensile strength 58 in the range of from approximately 6 ksi to approximately 70 ksi and a modulus of elasticity 60 in the range of from approximately 0.4 Msi to approximately 0.8 Msi. A composite article 10' comprising polyethylene fiber 64 may have a tensile strength 58 in the range of from approximately 10 ksi to approximately 300 ksi and a modulus of elasticity 60 in the range of from approximately 0.5 Msi to approximately 9.0 Msi.

As can be seen in FIG. 6, the composite article 10' comprised of polyethylene fiber 64 exhibits improved strength 58 and superior stiffness (i.e., modulus of elasticity 60) relative to a composite article 10' comprising glass fibers 66. More particularly, FIG. 6 illustrates that a composite article 10' comprising polyethylene fiber 64 may have a tensile strength 58 in the range of from approximately 10 ksi to approximately 300 ksi and a modulus of elasticity 60 in the range of from approximately 0.5 Msi to approximately 9.0 Msi. In contrast, the composite article 10' comprising glass fibers 66 is illustrated as having a tensile strength 58 in the range of from approximately 28 ksi to approximately 75 ksi and a modulus of elasticity 60 of from approximately 1.2 Msi to approximately 2.7 Msi. It should be noted that the above-recited values for the strength 58 (in ksi) and modulus of elasticity 60 (in Msi) for composite articles 10' comprised of organic fibers 62 are non-limiting examples and that higher values for the strength 58 (in ksi) and modulus of elasticity 60 (in Msi) are possible.

The polyethylene fiber 64 may comprise a stretched polyethylene fiber 64 configuration having improved tensile strength 58 relative to other fiber materials. The stretching of the polyethylene fiber 64 may facilitate alignment of the fiber molecules resulting in an increase in tensile strength and stiffness of the polyethylene fiber 64 which, when embedded within the matrix 16 of the composite article 10 (FIGS. 1-4), results in improved specific performance of the composite article 10'. For example, as indicated above, the polyethylene fiber 64 may result in an increase in specific stiffness of the composite article 10' relative to the specific stiffness of a composite article 10' fabricated with glass fiber 66.

As may be appreciated, the optical and mechanical performance of the composite article 10 (FIGS. 1-4) may be dependent in part upon the composition of the matrix 16 material and the organic fiber 18. The matrix 16 and the organic fiber 18 materials may be selected based on the intended application of the composite article 10 (FIGS. 1-4). Materials from which the organic fiber 18 may be formed include, without limitation, any suitable thermoplastic or thermosetting material. For example, thermoplastic material from which the matrix 16 and/or the organic fiber 18 may be formed include, without limitation, fluorocarbons, polyamides, polyethylenes, polyesters, polypropylenes, polycarbonates, polyurethanes, polyetheretherketone, polyetherketoneketone. Polyethylenes may include ultra high molecular weight polyethylene, high density polyethylene, or any other form of polyethylene including any other molecular weight of polyethylene. The thermoplastic material may also include Nylon™ and any one of a variety of other substantially transparent organic materials or combinations thereof. Thermosets from which the matrix 16 and/or the organic fiber 18 may be formed may include, without limitation, polyurethanes, phenolics, polyimides, bismaleimides, polyesters, epoxies, and any one of a variety of any other suitable transparent polymeric materials.

As indicated earlier, selection of the materials for the matrix 16 (FIGS. 1-4) and organic fiber 18 as well as selection of the organic fiber 18 geometry and arrangement including fiber shape, fiber thickness 26 (FIG. 4), fiber width 28 (FIG. 4), fiber spacing 34 (FIG. 4), layer spacing 36 (FIG. 4) and fiber volume may be based in part upon the environment (for example, temperature range and wavelength band of interest) to which the composite article 10 (FIG. 1) may be subjected. The composite article 10 may be configured in any one of a variety of configurations including the panel 14 configuration (FIG. 1) or any one of a variety of alternative configurations including, but not limited to, as a transparency of a vehicle such as a windshield and/or a canopy of an aircraft. In addition, the composite article 10 may be configured for use in any vehicular or non-vehicular application such as a structural panel or architectural panel for a building or structure or for a non-structural application. In this regard, the composite article 10 may be configured for use in any application, system, subsystem, structure, apparatus and/or device, without limitation.

Figure 7:
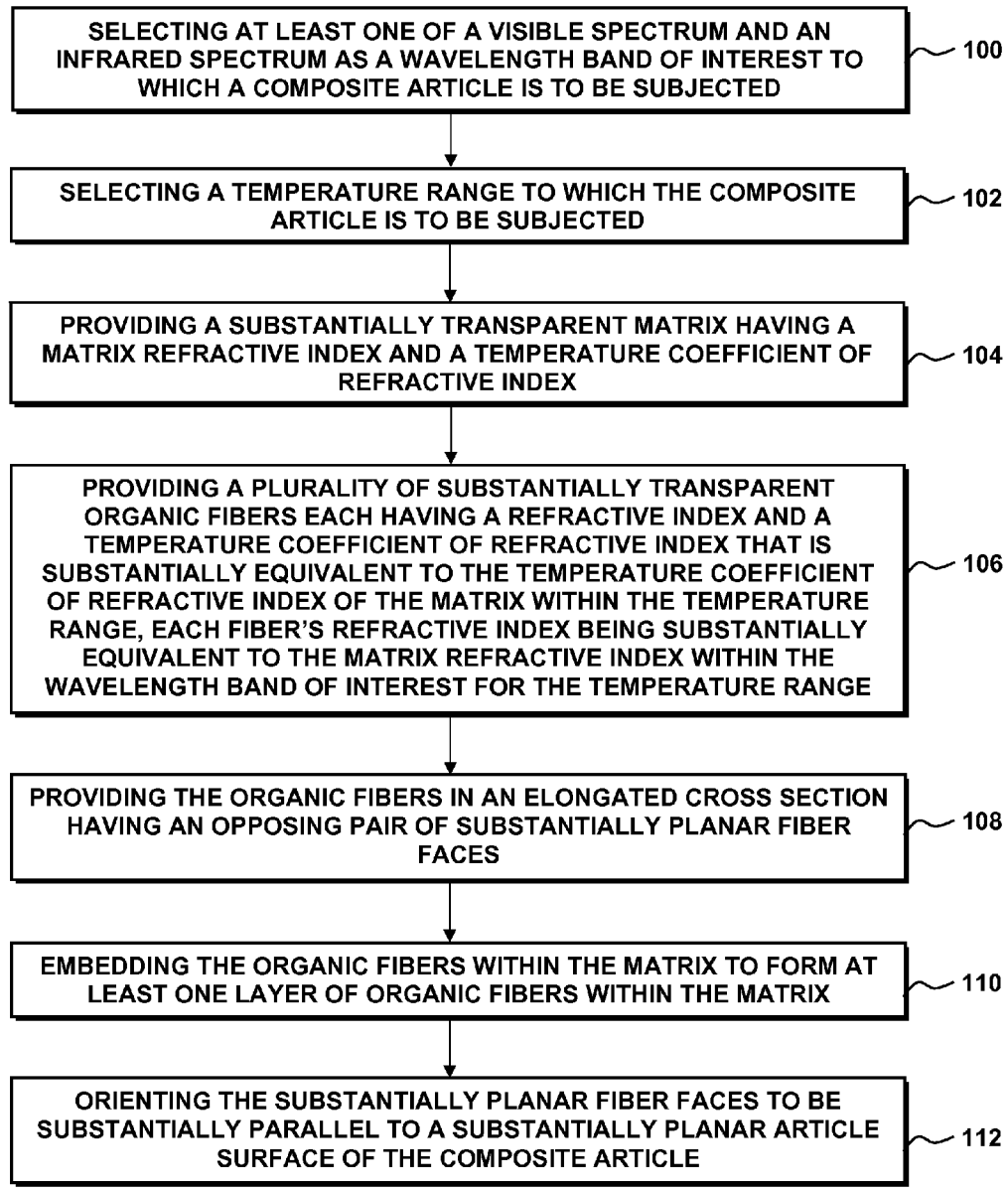
FIG. 7 is an illustration of a flowchart of one or more operations of a methodology of manufacturing a composite article.

Referring now to FIG. 7, shown is an illustration of a flowchart of one or more operations that may comprise a methodology of manufacturing a composite article 10 (FIG. 1). Step 100 of the methodology may include selecting a wavelength band of interest to which the composite article 10 may be subjected. For example, step 100 may include selecting the visible spectrum and/or the infrared spectrum of radiation to which the composite article 10 may be subjected. As was indicated earlier, in addition to varying with temperature, the refractive index of a material may also vary with the wavelength of radiation to which the material is subjected.

Step 102 of FIG. 7 may comprise selecting the temperature range within which the composite article 10 may be subjected. For example, the temperature range of the composite article 10 (FIG. 1) may extend from approximately −65° F. to approximately 220° F. However, depending upon the application, the operating temperature ranges of the composite article 10 may extend from approximately −65° F. to 180° F., from approximately −65° F. to 160° F., from approximately −40° F. to 160° F., or from approximately 0° F. to 130° F. However, the temperature range may extend between any set of temperatures including temperatures below −65° F. and/or temperatures above 220° F. and is not limited to the above-mentioned ranges.

As was indicated earlier, the refractive index of polymeric matrix 52 and organic fiber 50 may generally decrease with increasing temperature. The polymeric matrix 16 material may be selected such that the refractive index of the matrix 16 matches the refractive index of the organic fiber 18 at a match point 56 (FIG. 5) within the temperature range. In this manner, differences in refractive index between the matrix 16 and organic fiber 18 may be minimized as the temperature diverges (i.e., increases or decreases) from the match point 56 temperature. However, as was earlier indicated, the refractive index of the matrix 16 and organic fiber 18 may not necessarily match at any specific temperature within the temperature operating range.

Step 104 of the methodology of FIG. 7 may comprise providing a substantially transparent matrix 16 (FIGS. 1-4) having a matrix refractive index 52 and a temperature coefficient of refractive index. The matrix 16 may comprise any suitable matrix 16 for a given application. For example, as indicated above, the matrix 16 may comprise any suitable thermoplastic material or any suitable thermoset. Non-limiting examples of thermoplastic materials include the above-mentioned Nylon™, fluorocarbons, polyamides, polyethylenes, polyesters, polypropylenes, polycarbonates, polyurethanes, polyetheretherketone, polyetherketoneketone. Non-limiting examples of thermosets may include polyurethanes, phenolics, polyimides, bismaleimides, polyesters, and epoxies.

Step 106 of FIG. 7 may comprise providing at least one substantially transparent organic fiber 18 (FIGS. 1-4) having a refractive index 50 and a temperature coefficient of refractive index. The organic fiber 18 preferably has a refractive index 50 that is substantially equivalent to the matrix refractive index 52 within the wavelength band of interest. The matrix 16 may be selected such that the refractive index 52 of the matrix 16 is within a predetermined maximum difference relative to the refractive index 50 of the fiber 18 for a given temperature range. For example, the matrix 16 and the organic fiber 18 may be selected such that the refractive indices 52, 50, thereof, are within approximately 1 percent to approximately 3 percent of one another for any suitable temperature range such as in the temperature range of from approximately −65° F. to approximately 220° F. However, the refractive indices 52, 50 of the matrix 16 and the organic fiber 18 may be within any range of one another. For example, the refractive indices 52, 50 of the matrix 16 and the organic fiber 18 may differ from one another by greater than 3 percent. Additionally, the refractive indices 52, 50 of the matrix 16 and the organic fiber 18 may be within approximately 1 percent to 0.3 percent or less of one another. Furthermore, the temperature range for any of the above-noted differences in refractive indices 52, 50 of the matrix 16 and the organic fiber 18 may extend between any set of temperatures, without limitation.

The selection of the organic fiber 18 (FIGS. 1-4) in Step 106 may further comprise selecting the organic fiber 18 such that the temperature coefficient of refractive index thereof is substantially equivalent to the temperature coefficient of refractive index of the matrix 16. Advantageously, by selecting the matrix 16 and organic fiber 18 such that the temperature coefficients of refractive index are substantially equivalent, differences in refractive indices in the matrix 16 and organic fiber 18 may be minimized when temperature increases or decreases. For example, FIG. 5 illustrates that the refractive indices 52, 50 of the matrix 16 and the organic fiber 18 are substantially equivalent within a temperature range which results in a relatively small divergence in the matrix 52 and organic fiber 50 refractive indices.

Referring still to FIG. 7, Step 108 may comprise providing the organic fiber 18 in an elongated cross-sectional shape having an opposing pair of substantially planar fiber faces 20 (FIG. 4) which may preferably be oriented substantially parallel to an article surface 12 of the composite article 10 as illustrated in FIG. 4. However, the organic fiber 18 may be oriented such that the fiber faces 20 are oriented in non-parallel arrangement (not shown) relative to the article surfaces 12 of the composite article 10. Preferably, the organic fiber 18 (FIG. 4) has an approximately rectangular cross-sectional shape having opposing substantially planar fiber faces 20 that are substantially parallel to one another along a through-thickness direction of the organic fiber 18. However, as was indicated above, the organic fiber 18 may be provided in any suitable configuration and is not limited to an elongated or rectangular cross-sectional shape.

Step 110 of the methodology of FIG. 7 may include embedding a plurality of the organic fibers 18 within the matrix 16 as shown in FIG. 4. In an embodiment, the plurality of organic fibers 18 may be arranged in the layer 32 configuration as illustrated in FIGS. 2-5. The organic fibers 18 within each layer 32 may be spaced at a desired fiber spacing 34 defined as an average lateral distance between the fiber edges 22 of adjacent ones of the organic fibers 18 in a given layer 32 as illustrated in FIG. 4. The organic fibers 18 in adjacent ones of the layers 32 may be arranged such that the axes 30 (FIG. 3) of the organic fibers 18 in one layer 32 are oriented at a predetermined angle such as at an approximate 90° angle relative to the fiber axes 30 of the organic fibers 18 of immediately adjacent layers 32 as illustrated in FIG. 3. However, the axes 30 of the organic fibers 18 in one layer 32 may be oriented at any one of a variety of alternative angles relative to the fiber axes 30 of the organic fibers 18 of immediately adjacent layers 32. For example, the axes 30 of the organic fibers 18 in one layer 32 may be oriented at any non-perpendicular angle (e.g., 15°, 22.5°, 45°, 60°, etc.) relative to the fiber axes 30 of the organic fibers 18 of immediately adjacent layers 32.

Step 112 of the methodology of FIG. 7 may comprise orienting the fiber faces 20 (FIG. 4) of the organic fibers 18 to be substantially parallel to the article surface 12 of the composite article 10 to maintain optical clarity of the composite article 10. The organic fibers 18 may be provided in any suitable cross-sectional shape as indicated above and in any suitable fiber volume relative to the total volume of the composite article 10. Advantageously, the substantially equivalent refractive indices of the matrix 16 and the organic fiber 18 within a range of temperatures improves optical transmission and minimizes distortion of the composite article 10.

Additional modifications and improvements of the present disclosure may be apparent to those of ordinary skill in the art.

Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A composite article, comprising:
a substantially transparent matrix having a matrix refractive index;
at least one substantially transparent organic fiber embedded within the matrix, the organic fiber having a refractive index that is substantially equivalent to the matrix refractive index within a wavelength band of interest;
the organic fiber having an elongated cross section and being a non-multi-layer structure; and
the matrix and the organic fiber having substantially equivalent temperature coefficients of refractive index.

2. The composite article of claim 1 wherein:
the refractive indices and the temperature coefficients of refractive index of the matrix and the organic fiber are such that the refractive indices of the matrix and the organic fiber are equivalent at a given wavelength within the wavelength band of interest for at least one temperature within a temperature range.

3. The composite article of claim 1 wherein:
the refractive indices and the temperature coefficients of refractive index of the matrix and the organic fiber are such that the refractive indices of the matrix and the organic fiber are within approximately 1 to 3 percent of one another within the wavelength band of interest for a temperature range of from approximately −65° F. to approximately 220° F.

4. The composite article of claim 1 wherein:
the wavelength band of interest comprises at least one of the infrared spectrum and the visible spectrum.

5. The composite article of claim 1 wherein:
the cross section has an aspect ratio of fiber width to fiber thickness; and
the aspect ratio being in the range of from approximately 3 to approximately 500.

6. The composite article of claim 5 wherein:
the fiber thickness is in the range of from approximately 5 microns to approximately 5000 microns.

7. The composite article of claim 1 wherein:
the substantially planar fiber faces are substantially parallel to a substantially planar article surface of the composite article.

8. The composite article of claim 1 wherein at least one of the matrix and the organic fiber are formed from at least one of the following:
a thermoplastic material; and
a thermoset.

9. The composite article of claim 8 wherein:
the thermoplastic material comprises at least one of the following: fluorocarbons, polyamides, polyethylenes, polypropylenes, polycarbonates, polyurethanes, polyetheretherketone, polyetherketoneketone; and
the thermoset comprises at least one of the following: polyurethanes, phenolics, polyimides, bismaleimides, polyesters, epoxy.

10. The composite article of claim 1 configured as at least one of the following:
a windshield, a canopy, a window, a membrane, a structural panel, an architectural panel, a non-structural article.

11. A substantially optically transparent composite article, comprising:
a substantially transparent matrix having a matrix refractive index;
a plurality of substantially transparent organic fibers embedded within the matrix, the organic fibers having a refractive index that is substantially equivalent to the matrix refractive index within at least one of the visible spectrum and the infrared spectrum; and
the matrix and the organic fibers having substantially equivalent temperature coefficients of refractive index;
the organic fibers having an elongated cross section and being a non-multi-layer structure.

12. A method of manufacturing a composite article, comprising the steps of:
providing a substantially transparent matrix having a matrix refractive index;
providing at least one substantially transparent organic fiber having a refractive index that is substantially equivalent to the matrix refractive index and having an elongated cross section and opposing substantially planar fiber faces oriented parallel to one another;
selecting a wavelength band of interest;
selecting the matrix and the organic fiber such that a temperature coefficient of refractive index of the matrix is substantially equivalent to a temperature coefficient of refractive index of the fiber within the wavelength band of interest;
embedding the organic fiber within the matrix; and
minimizing a scattering of light incident on the composite article in response to the fiber faces being substantially planar and oriented parallel to one another.

13. The method of claim 12 further comprising the step of:
selecting the matrix and the organic fiber such that the refractive indices thereof are equivalent at a given wavelength within the wavelength band of interest for at least one temperature within a temperature range.

14. The method of claim 12 further comprising the step of:
selecting the matrix and the organic fiber such that the refractive indices thereof are within approximately 1 to 3 percent of one another for the temperature range of from approximately −65° F. to approximately 220° F.

15. The method of claim 12 further comprising the step of:
selecting at least one of the infrared spectrum and the visible spectrum as the wavelength band of interest.

16. The method of claim 12 further comprising the step of:
orienting the fiber such that the substantially planar faces of the fiber cross section are substantially parallel to a substantially planar article surface of the composite article.

17. The method of claim 12 wherein at least one of the matrix and the organic fiber is formed from at least one of the following:
a thermoplastic material; and
a thermoset.

18. The method of claim 17 wherein:
the thermoplastic material comprises at least one of the following: fluorocarbons, polyamides, polyethylenes, polyesters, polypropylenes, polycarbonates, polyurethanes, polyetheretherketone, polyetherketoneketone; and
the thermoset comprises at least one of the following: polyurethanes, phenolics, polyimides, bismaleimides, polyesters, epoxy.

19. A method of manufacturing a composite article, comprising the steps of:
selecting at least one of a visible spectrum and an infrared spectrum as a wavelength band of interest to which the composite article is to be subjected;

selecting a temperature range to which the composite article is to be subjected;

providing a substantially transparent matrix having a matrix refractive index and a temperature coefficient of refractive index;

providing a plurality of substantially transparent organic fibers having a refractive index and a temperature coefficient of refractive index that is substantially equivalent to the temperature coefficient of refractive index of the matrix within the temperature range, the refractive index of the fibers being substantially equivalent to the matrix refractive index within the wavelength band of interest;

providing the organic fibers in an elongated cross section having an opposing pair of substantially planar fiber faces oriented parallel to one another;

embedding the organic fibers within the matrix to form at least one layer of organic fibers within the matrix;

orienting the substantially planar fiber faces to be substantially parallel to a substantially planar article surface of the composite article; and minimizing a scattering of light incident on the composite article in response to the fiber faces being substantially planar and oriented parallel to one another.

* * * * *